(12) United States Patent
Meyers (10) Patent No.: US 8,842,041 B1
(45) Date of Patent: Sep. 23, 2014

(54) METHOD AND APPARATUS FOR HANDLING 2-D FIXES

(75) Inventor: Richard C. Meyers, Longboat Key, FL (US)

(73) Assignee: GlobalTrak, LLC, Dulles, VA (US)

( * ) Notice: Subject to any disclaimer, the term of this patent is extended or adjusted under 35 U.S.C. 154(b) by 343 days.

(21) Appl. No.: 13/446,905

(22) Filed: Apr. 13, 2012

Related U.S. Application Data (60) Provisional application No. 61/475,029, filed on Apr. 13, 2011.

(51) Int. Cl.
*G01S 19/07* (2010.01)

(52) U.S. Cl.
USPC .................................................... 342/357.44

(58) Field of Classification Search
CPC ........................................................ G01S 19/07
USPC ..................................................... 342/357.44
See application file for complete search history.

(56) References Cited

U.S. PATENT DOCUMENTS

2003/0158638 A1* 8/2003 Yakes et al. ................... 701/22
2010/0321179 A1* 12/2010 O'Toole et al. ............ 340/539.1

* cited by examiner

*Primary Examiner* — Harry Liu (57) ABSTRACT

The present invention provides a system for increasing the reliability of location data received from a container monitoring unit. According to a first embodiment, the system includes a GPS mesh network device to communicate with existing GPS devices and a remote monitoring station which receives data from unit devices applying back-end analysis for determining the most accurate and robust geo-location for each unit. The present invention provides a method to coordinate analysis of data to improve determination of the exact location and status of assets. This increased visibility will enable the customer to pinpoint the real time location of a single box more. This level of real time asset management translates into greater operational efficiency and performance, cost reductions, and improved safety and security.

10 Claims, 7 Drawing Sheets

METHOD AND APPARATUS FOR HANDLING 2-D FIXES

BACKGROUND OF THE PRESENT INVENTION

1. Field of the Present Invention

The present invention relates to a method for determining the best GPS position data for a cargo container. More particularly, the present invention provides a method for communicating between multiple GPS enabled devices being transported together and applying analysis to find the exact location of a single unit, container or box.

2. Description of Related Art

Currently, smart container monitoring systems employ GPS transponders to track assets. However, the strength and reliability of the GPS signal can be degraded by many factors. For instance, reliable location data from an automotive GPS may be hampered by metallic features in windshields, such as defrosters or car window tinting films, which can act as a Faraday cage and degrade reception inside the car. Furthermore, man-made electromagnetic interference (EMI) can also disrupt GPS signals. In one well-documented case, it was impossible to receive GPS signals in the entire harbor of Moss Landing, Calif. due to unintentional jamming caused by malfunctioning TV antenna preamplifiers.

Signal degradation can also occur due to intentional jamming. Generally, stronger signals can interfere with GPS receivers when they are within radio range or line of sight. In 2002, a detailed description of how to build a short-range. GPS LI C/A jammer was published in an online magazine. The U.S. government believes that such jammers were used occasionally during the 2001 war in Afghanistan.

There are several techniques which are currently employed to address interference. Receiver Autonomous Integrity Monitoring (RAIM) is included in some receivers, to warn if jamming or another problem is detected. Since 2004, the U.S. military has also deployed their Selective Availability/Anti-Spoofing Module (SAASM) in the Defense Advanced GPS Receiver (DAGR). DAGR detects jamming and maintains its lock on encrypted GPS signals during interference.

Despite various technologies available, there is no reliable solution that enables a shipping container to reliably obtain accurate geo-location data when satellite coverage is limited.

SUMMARY OF THE PRESENT INVENTION

To address the problems and limitations noted above, a system for increasing the reliability of location data received from a smart container monitoring unit is provided. According to a first embodiment, the system includes a GPS mesh network device to communicate with existing GPS devices and a remote monitoring station. The present invention further provides a method to coordinate analysis of data to improve determination of the exact location and status of a tracked container. This increased visibility will enable the customer to pinpoint the real time location of a single box more accurately and efficiently. This level of real time asset management translates into greater operational efficiency and performance, cost reductions, and improved safety and security.

The accompanying drawings, which are incorporated in and constitute part of the specification, illustrate various embodiments of the present invention and together with the description, serve to explain the principles of the present invention.

DESCRIPTION OF THE PREFERRED EMBODIMENTS

For the purposes of promoting an understanding of the principles of the present invention, reference will now be made to the embodiments illustrated in the drawings and specific language will be used to describe the same. It will nevertheless be understood that no limitation of the scope of the present invention is hereby intended and such alterations and further modifications in the illustrated devices are contemplated as would normally occur to one skilled in the art.

The terms "program," "computer program," "software application," and the like as used herein, are defined as a sequence of instructions designed for execution on a computer system. A program, computer program, or software application may include a subroutine, a function, a procedure, an object implementation, an executable application, an applet, a servlet, a source code, an object code, a shared library, a dynamic load library and/or other sequence of instructions designed for execution on a computer system. A data storage means, as defined herein, includes many different types of computer readable media that allow a computer to read data therefrom and that maintain the data stored for the computer to be able to read the data again. Such data storage means can include, for example, non-volatile memory, such as ROM, Flash memory, battery backed-up RAM, Disk drive memory, CD-ROM, DVD, and other permanent storage media. However, even volatile storage such a RAM, buffers, cache memory, and network circuits are contemplated to serve as such data storage means according to different embodiments of the present invention.

Figure 1:
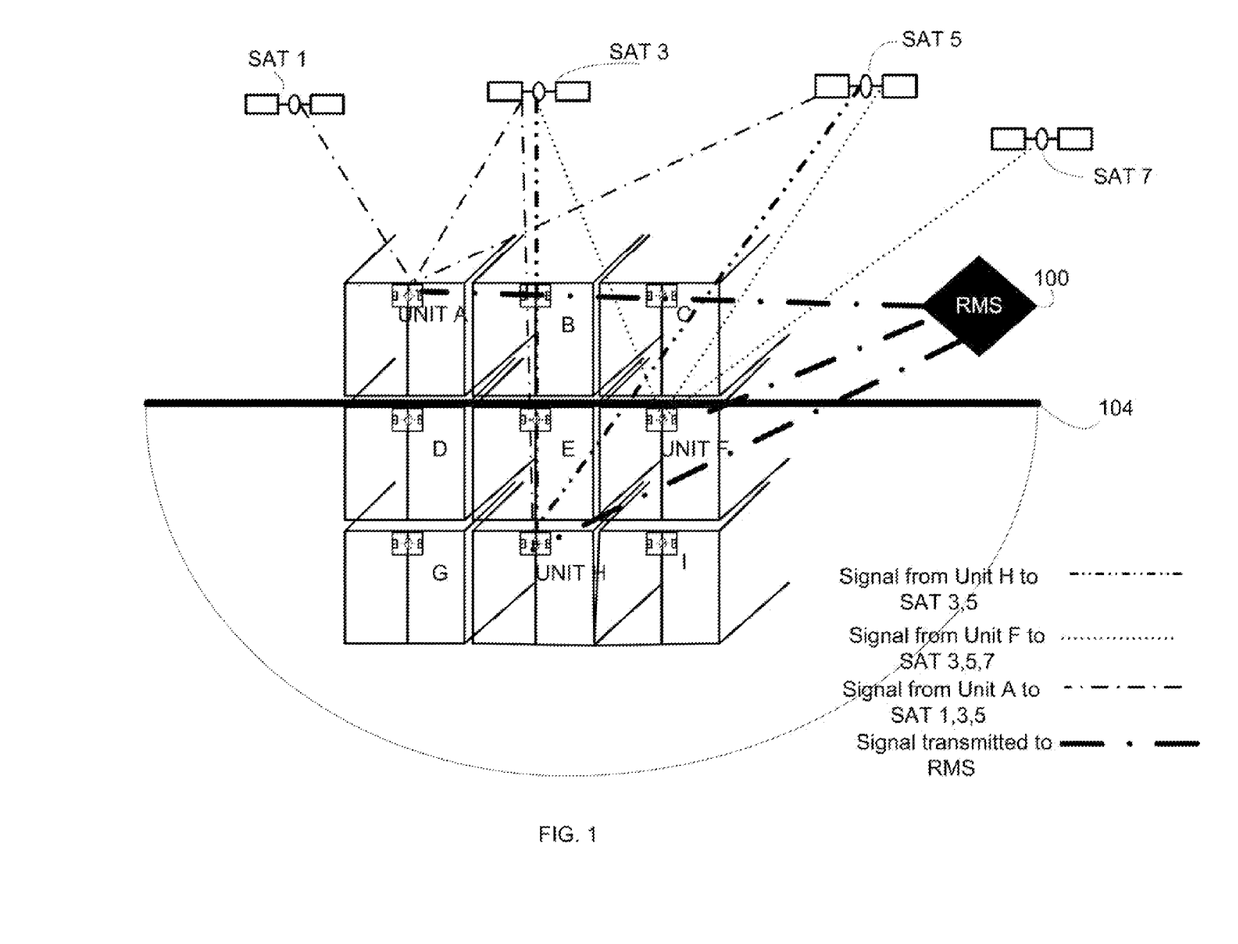
FIG. 1 shows a functional configuration in accordance with an embodiment of the present invention.

With reference now to FIG. 1, a functional configuration in accordance with an embodiment of the present invention will now be discussed. As shown in FIG. 1, a cross-sectional view of the deck of a ship 104 is provided on which three smart cargo containers, A-C, are stacked above the ship's deck 104 and six smart cargo containers, D-I, are positioned below the ship's deck 104. Additionally, satellites 1, 3, 5 and 7 and a Remote Monitoring Station (RMS) 100 are illustrated. As further shown in FIG. 1, container unit A is in a position to send a signal from its GPS transponder to SAT 1, SAT 3 and SAT 5 only and receive a signal back from SAT 1, SAT 3 and SAT 5 only. In the embodiment as shown, Unit A will determine its location based on the signals received from Satellites 1, 3 and 5, and then will transmit the determined location and data to the RMS 100.

As further shown in FIG. 1, container unit F is below the ship's deck yet is in a position to send a signal from its GPS transponder to SAT 3, SAT 5, and SAT 7 only. For the purposes of this example, Unit F will also determine its location based on the signals received from Satellites 3, 5 and 7 and then will also transmit the determined location and data to the RMS 100. As also shown in FIG. 1, the GPS transponder of the monitoring device of container Unit H which is positioned well below the ship's deck 104 is only capable of receiving a return signal from satellites 3 and 5. In this position, Unit H will determine its location based on the signals received from satellites 3 and 5 and then will transmit its determination of its location and signal data to the RMS 100. Preferably, the RMS 100 may receive and collect the data from Units A, F and H and using a multilateration of each satellite signal with respect to the each container unit and the Uplink Time Difference of Arrival (U-TDOA) analysis of the signal from the RMS 100 to each unit to determine the most accurate geo-location of each Unit: A, F and H. After backend analysis is completed, the RMS 100 may transmit the updated and most accurate geo-location of each container to the monitoring unit of each container.

Preferably, an RMS may query each unit for geo-location data on a preprogrammed basis and serve to update tracking information to shipping companies and customers on a routinely programmed basis. Also preferably, the RMS may query any or all units for geo-location, status, or updates on a constant, random or as needed basis.

Figure 2:
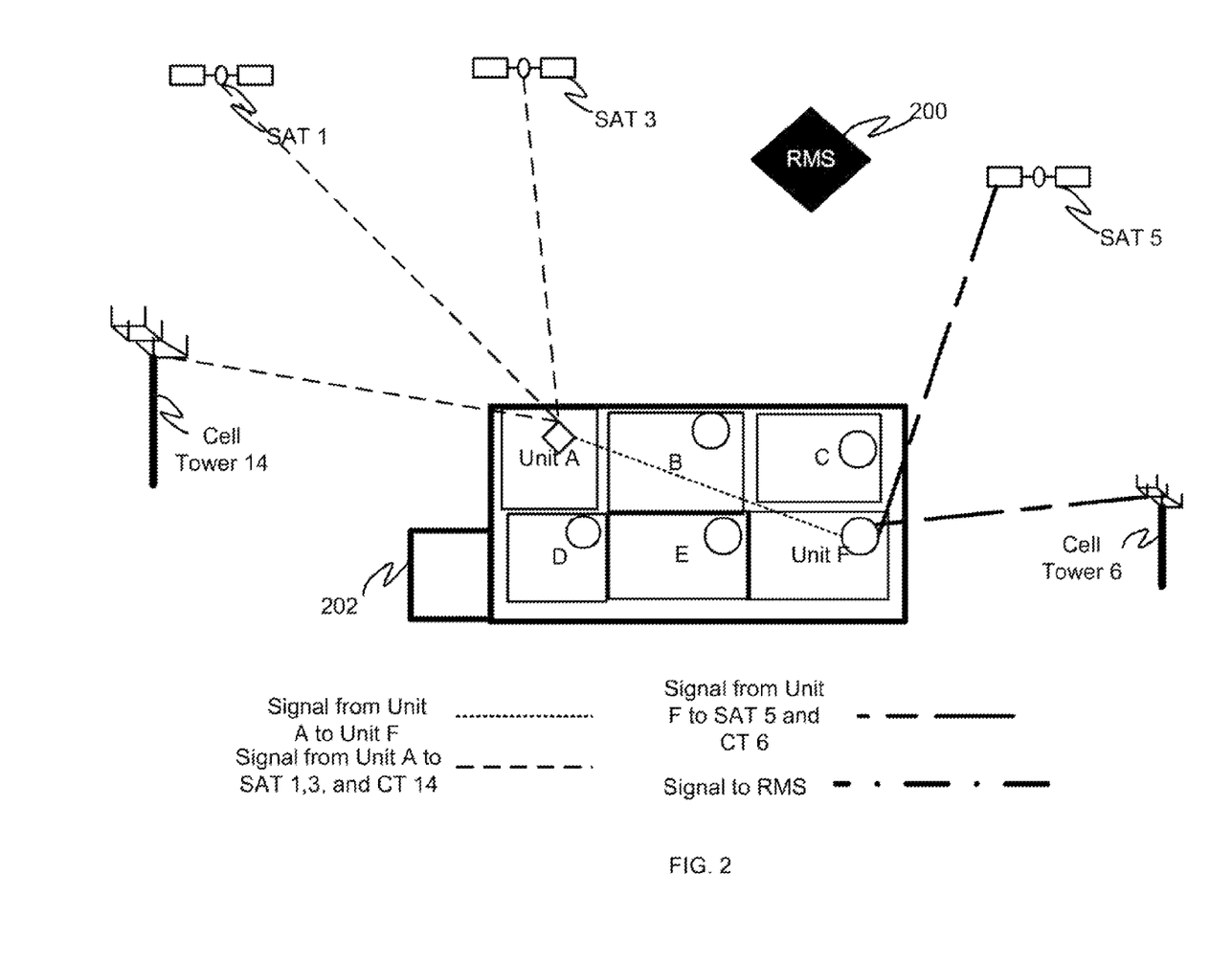
FIG. 2 shows a functional configuration in accordance with an embodiment of the present invention.

With reference now to FIG. 2, a functional configuration in accordance with an embodiment of the present invention will now be discussed. As shown in FIG. 2, an independent carrier 202, transporting multiple shipments from different shipping companies is provided. Preferably, each shipping company is responsible for accurately tracking their shipments via a smart container monitoring device capable of sensing, communicating, and processing the status of each container individually. The independent carrier may or may not be responsible for monitoring the status of each container unit or for communicating the status of each container to the RMS 200. In this example, it is preferred that the monitoring units on each container include a GPS transponder. Also, with reference to FIG. 2, it is to be assumed that conditions are prohibiting all but two GPS transponders from receiving satellite signals. Therefore, conditions are such that Unit A is receiving signals from two satellites, 1 and 3, and Unit F is also receiving signals from only two satellites, 3 and 5. Further, for purposes of illustration, container monitoring units B, C, D, and E are shown failing to pick up any signals from any satellites but may respond when queried by the container device of Unit A. In this example, when Unit A queries Units B, C, D, and E for identity and location, these units may respond with their respective identities and location data for each. Further, when Unit A queries Unit F, Unit F preferably responds by identifying itself and providing data regarding its location.

As further shown in FIG. 2, exemplary container Unit A is signaling to Satellites 1 and 3 but can also transmit to and receive a wireless signal from Cell Tower 14. In the embodiment as shown, Unit A will preferably determine its location based on the signals received from Satellites 1 and 3, and the location of Cell Tower 14 and then will transmit the determined location and data to the RMS 200.

As further shown in FIG. 2, container Unit F is signaling to Satellites 3 and 5 only but can also transmit to and receive a wireless signal from Cell Tower 6. In the embodiment as shown, Unit F will determine its location based on the signals received from Satellites 3 and 5, and the location of Cell Tower 6 and then will transmit the determined location and data to the RMS 200.

According to a further aspect of the present invention, the RMS 200 may receive and collect the data from Units A and F. Further, RMS 200 may use Uplink Time Difference of Arrival (U-TDOA) analysis to determine the most accurate geo-location of Units A and F. After backend analysis is completed, the RMS 100 may transmit the updated and most accurate geo-location of each container unit. Preferably, Unit A may transmit its geo-location as determined by the RMS to Units B, C, D and E. Also preferably, Units B, C, D, and E will acknowledge receipt and update the geo-location of each unit individually. Also preferably, Units B, C, D, and E may attempt to contact the RMS 200 individually and update the geo-location of each unit as a means of confirming that transmission was successful.

Preferably, each container monitor unit, A-F, may be equipped with a GPS Mesh Network device which includes a radar range finder capable of transmitting an RF signal to determine the distance from itself to every other unit monitoring device within a selected range ("pinging"). In response to this pinging, it is preferred that a target container is equipped with an RFIP tag or similar device which produces a response when queried. For example, an RFID tag may be programmed to transmit a distinctly identifiable code or number in response. Based on responsive signals, the controller unit may create a map of the relative locations of all monitored devices and may transmit this data to the RMS 200 for further analysis.

Figure 3:
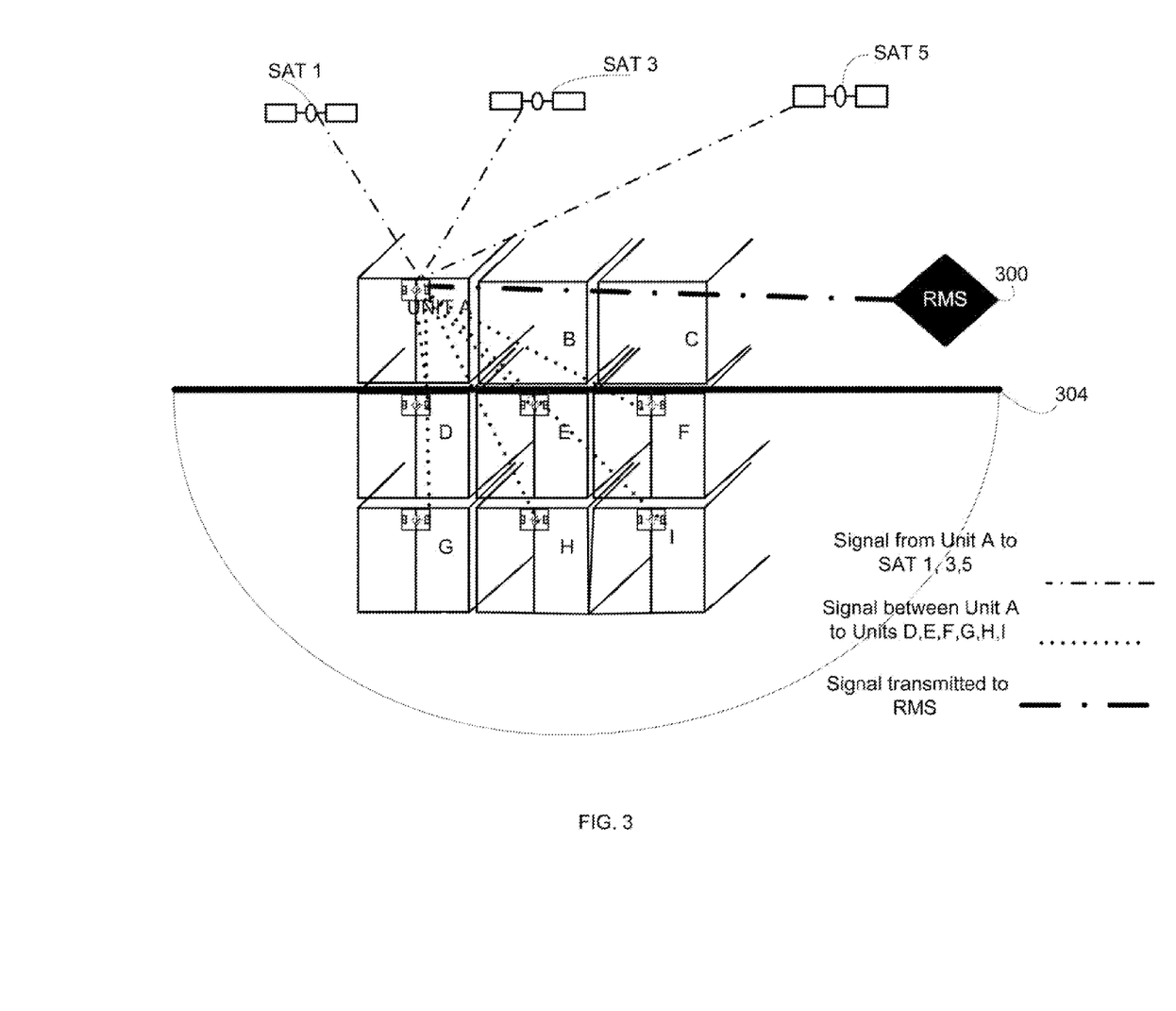
FIG. 3 shows a functional configuration in accordance with an embodiment of the present invention.

With reference now to FIG. 3, a functional configuration in accordance with the present invention will now be discussed. As shown in FIG. 3, a cross-sectional view of the deck of a ship 304 is provided on which three smart cargo containers, A-C, are shown stacked above the ship's deck 304 and six smart cargo containers, D-I, are positioned below the ship's deck 304. Further, exemplary satellites 1, 3 and 5, and a Remote Monitoring Station (RMS) 300 are illustrated as well. As shown in FIG. 3, container unit A is in a position to send a signal from its GPS transponder to SAT 1, SAT 3 and SAT 5 only and to receive a signal back from SAT 1, SAT 3 and SAT 5 only. In the embodiment as shown, Unit A will determine its location based on the signals received from Satellites 1, 3 and 5, and then will transmit the determined location and data to the RMS 300.

As shown in FIG. 3, for illustrative purposes, Units B and C are provided as "dumb" containers (i.e. containers without monitoring or communication capabilities). Additionally, Units D, E, F, G, H, and I are shown in a position where they cannot transmit signals due to a Faraday Cage effect caused by the ship's hull. However, as shown, Unit A can query Units D-1 and serve as a relay node for Units D-I.

Within this exemplary environment, it is preferred that Unit A transmits a message to the RMS 300, it may identify itself, indicate that it is transmitting signals from Units D-I, report that Units D-I are receiving no geo-location signals, and report its data and distance from Satellites 1, 3 and 5. Based on the information received by Unit A from the satellites 1, 3 and 5, Unit A will report its geo-location and request that the RMS 300 verify its location based on its time/distance (T-UDOA) signal to the RMS 300 and its position relative to Units D-I. Preferably, the RMS 300 may verify the position of Unit A based on data from Satellites 1, 3 and 5 and the T-UDOA to Unit A and by comparing its results to Unit A's geo-location data. If variances in the determined locations are determined to be too large, the system preferably will reinitiate a request for location data. If the resulting geo-location positions are in agreement, Unit A may transmit to Units D-I an accurate geo-location.

Figure 4:
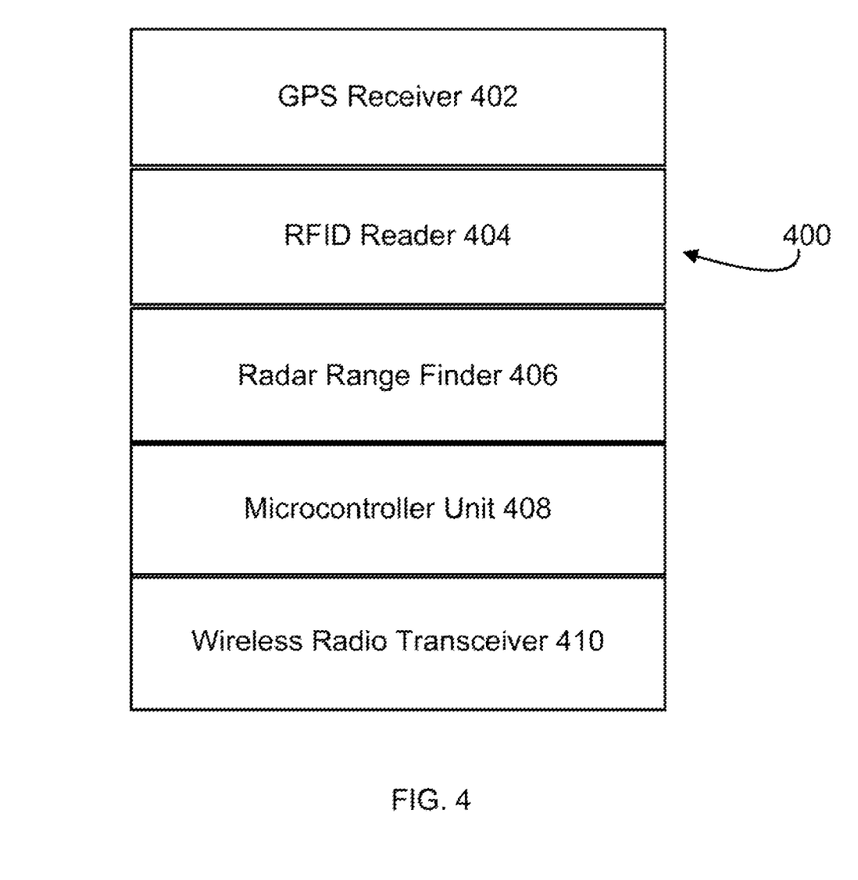
FIG. 4 shows a block diagram of a unit device in accordance with an embodiment of the present invention.

With reference now to FIG. 4, the details of a block diagram in accordance with an embodiment of the present invention will now be discussed. As shown in FIG. 4, a Global Positioning System Mesh Network Device 400 (GPSMND) comprises a GPS receiver 402, an RFID reader 404, radar range finder 406, a microcontroller unit 408 and a wireless radio transceiver 410. The GPSMND may be a stand-alone unit inserted or affixed, either temporarily or permanently, into a compartment, such as a ships hold, freight warehouse, or trailer unit.

Figure 5:
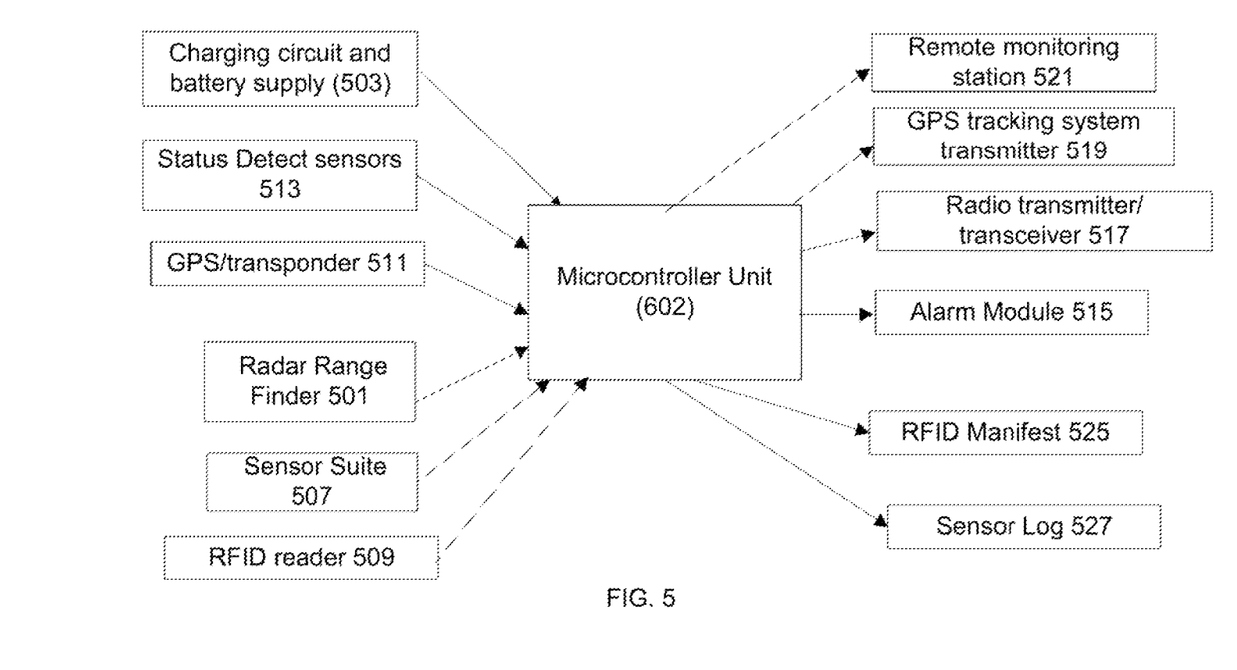
FIG. 5 shows a block diagram of the electrical wiring in accordance with an embodiment of the present invention.

With reference now to FIG. 5, a block diagram of the electrical wiring in accordance with an embodiment of the present invention will now be discussed. A microcontroller unit 602 receives input from a charging circuit and battery cells 503, the status detect sensors 513, an RFID reader 509, a Radar Range Finder 501, a GPS Transponder 511 and variable sensors in suite 507. The microcontroller unit 602 then assesses all the information and sends out signals to a radio transmitter/transceiver 517, a sensor log 527, a remote monitoring station 521, a GPS tracking system transmitter 519, an alarm module 515, and an RFID Manifest 525. Data from these sensors is processed, stored, and acted upon by the microcontroller unit 602.

Preferably, the sensor unit of the present invention includes circuitry and digital ports to connect to existing electrical and sensor management systems of trailers and containers previously configured with embedded circuitry. In operation, a microcontroller unit 602 is preferably programmed to routinely scan the condition of each sensor to ensure operability.

Figure 6:
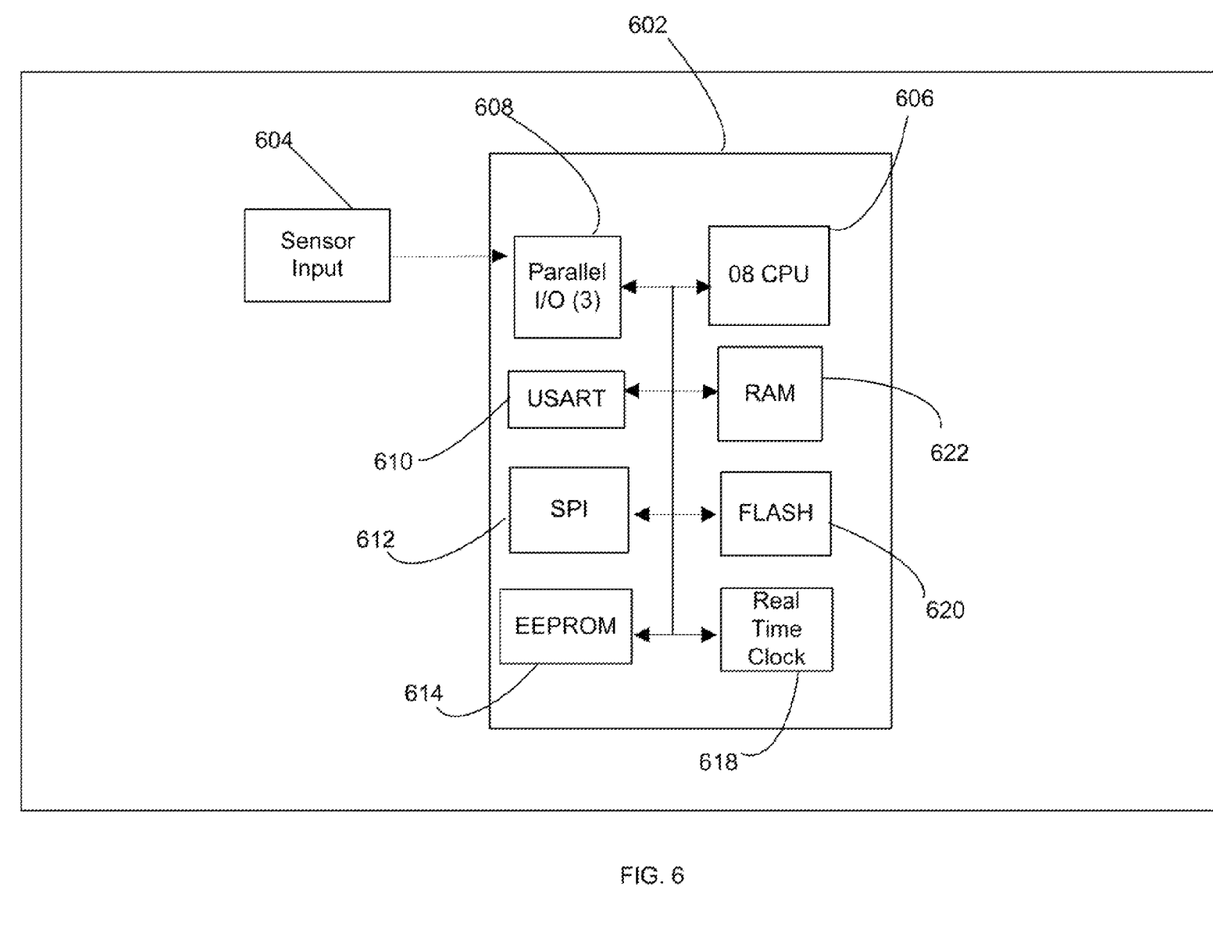
FIG. 6 shows a block diagram of a sensor control unit in accordance with an embodiment of the present invention.

With reference now to FIG. 6, it is preferred that the microcontroller unit 602 receives data from the sensor suite 604 and incorporates a microprocessor 606, a real time clock 618, a general purpose Input/Output port to support external peripheral control 608, a Universal Synchronous/Asynchronous Receiver Transmitter (USART) 610, a Serial Port Interface (SPI) 612, and memory such as RAM 622, FLASH memory 620, and EEPROM 614 as shown.

Preferably, the microprocessor 606 used may be a low power, high performance, eight-bit intergrated circuit based on the Motorola HCS08 instruction set. The controller 602 will preferably manage power and host the master date-time clock, communication scheduling and annotation of flash memory records.

Figure 7:
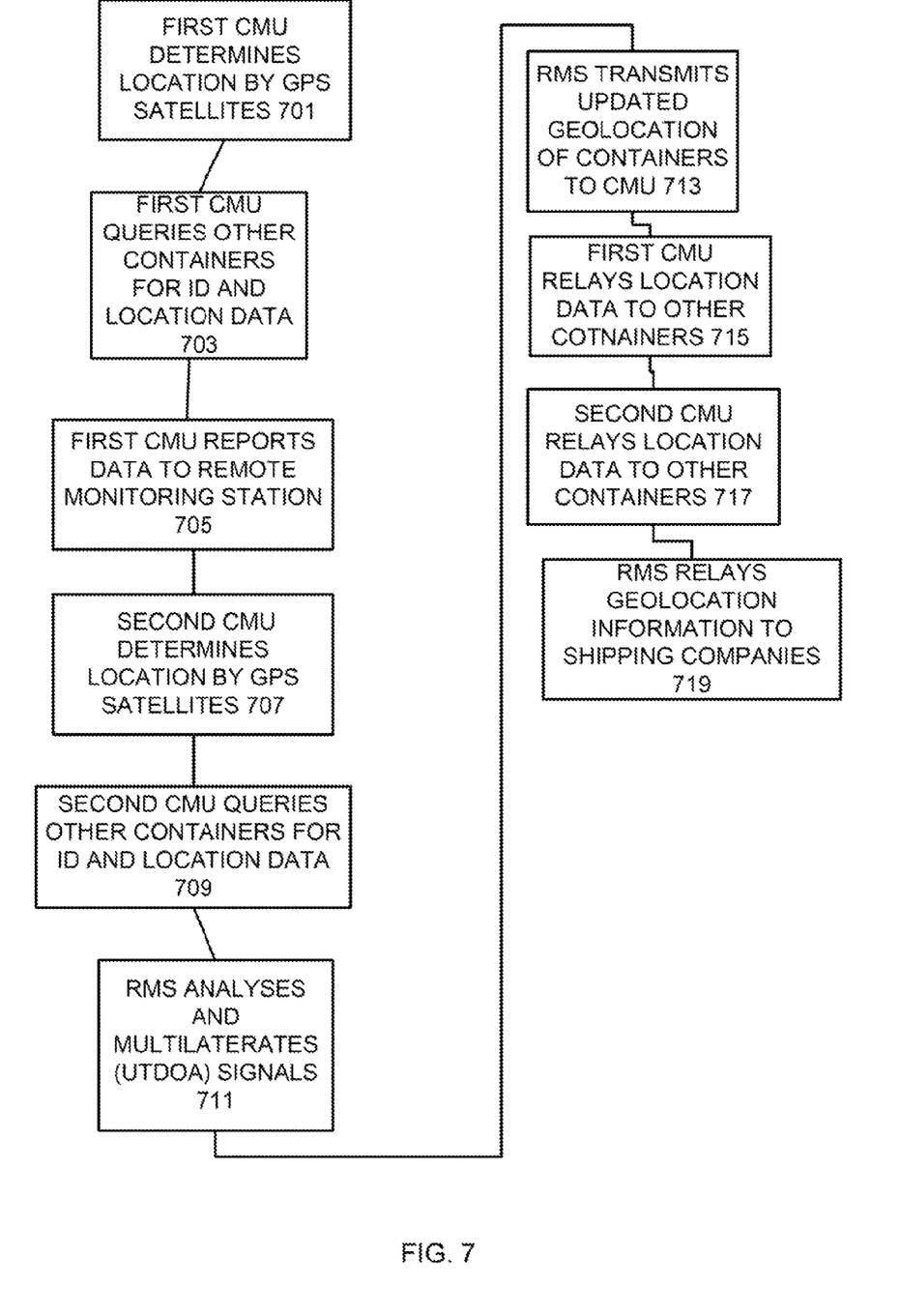
FIG. 7 shows a flow chart diagram of a preferred method in accordance with the present invention.

With reference now to FIG. 7, a method in accordance with the present invention will now be discussed. As shown in FIG. 7, a first container monitoring unit (CMU) will determine its location via a GSP transponder 701. Following determining its own location, the CMU of the first container will send out a query of other containers for their identifying information and location 703. The first container's CMU may then report the data it has collected to a remote monitoring station (RMS) 705. In accordance with a further aspect of the present invention, a second CMU from a second container may determine its location by GPS 707 and thereafter query other containers for their identifying information and location data 709. The second CMU will then preferably report the collected data to the RMS 711 which will further analyze the signals and data. For example, the RMS may use techniques of multilateration and Uplink Time Difference of Arrival (U-TDOA) analysis.

After determining and updating the geo-location of the containers, the RMS will transmit this updated geo-location data back to the CMU of the containers 713. The first and second CMU's will then preferably relay the updated location data to the other containers 715, 717. Preferably, the RMS will work to continuously track and update container locations and preferably continually relay that information to the shipping companies 719 for real-time asset tracking.

Communication System

In accordance with a preferred embodiment of the present invention, the reporting may be made via a wireless connection to a satellite mode to communicate with a satellite system such as Globalstar or Orbcomm. Preferably, such a satellite device will be a device such as the Axxon, AutoTracker, or the like, or a customized OrbComm VHF satellite GPS tracking communications device which may be adapted with Zigbee interface antenna devices to incorporate them into the overall LAN architecture of the security system; these devices include a satellite transceiver, GPS receiver, a customized Zigbee wireless antenna with a serial (Ax Tracker) or duplex (OrbComm) interface.

In accordance with an alternative preferred embodiment of the present invention, the reporting may also be made using a wireless system independent from the satellite system. According to this embodiment, wireless signals may be transmitted to a wireless relay, base station or the like for routing and transmission to a chosen centralized location independent from or in combination with the transmissions made from the satellite system. In accordance with this alternative embodiment, signals may also be received by the communications manager and wireless interface from such external wireless networks as well.

According to a preferred embodiment of the present invention, it is preferred that the wireless communications used within the present invention will be based on the Zigbee (IEEE 802.15.4) standard. This standard transmits RF signals in the 2.4 GHz ISM band and operates with low power consumption due to its relatively slower data transmission rate (128 Kpps-250 Kbps). This approach enables additional capacity and flexibility of design through an up to 255 node pico-network. Communications are simplex or duplex in design, meaning that data can be assessed in either a push or pull process.

As referred to above, all communications of the present invention may be designed to be duplex or simplex in nature. Further, as needs require, the processes for transmitting data to and from the present invention may be designed to be push or pull in nature. Still, further, each feature of the present invention may be made to be remotely activated and accessed from distant monitoring stations. Accordingly, data may preferably be uploaded to and downloaded from the present invention as needed. For example, as detailed above, each system and subsystem of the present invention may be designed to send, receive, report and request information via the wireless and/or satellite systems so as to continually maintain and update the container systems.

Additional communications with the communications manager are preferably enabled via industry standard wired interfaces, with communications protocols implemented in firmware for future upgrade. These interfaces preferably will include at least two RS-322 compatible serial ports. These alternate serial ports may assist the communications manager to interface with additional remote sensors as well as other local reader/controllers such as an RFID reader or other devices.

Remote Monitoring

To support and monitor the data flow generated by the present invention, it is preferred that users establish a centralized location to collect and analyze data. This central location or "data fusion center" would preferably consolidate all tracking signals, sensor' alarms and reports generated by the monitoring systems and provide further context and links with current intelligence.

Preferably, such a data fusion center will receive such source information in a variety of formats such as Electronic Data interchange, XML, E-mail, HTML and flat text files. After receiving such data, the data fusion center preferably would act to process information to identify anomalies. With this data collected and processed, analyst may calculate statistics and probability of detection models used for decision support. In short, such a data fusion center would preferably provide a consolidated source of information that could be used to assist agencies and shippers The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. In a transportation system including at least a first container monitored by a first monitoring unit and having a first GPS transponder, and a second container monitored by a second monitoring unit and having a second GPS transponder, a method for determining the location of at least one container, the method comprising:
    determining the location for the first container from the first GPS transponder;
    determining the location of the second container from the second GPS transponder;
    initiating a request by the first monitoring unit for location and identifying data from the second container;
    reporting the location and identifying data from the first and second containers to a remote monitoring station;
    initiating a request by the second monitoring unit for location and identifying data from at least a third container;
    reporting data collected by the second container to a remote monitoring station;
    determining a derived location for the first and second containers based on the time and direction of the signals received from the first and second container monitoring units at the remote monitoring station;
    comparing the derived location of the first and second containers to the GPS determined locations of the first and second containers;
    creating adjusted location data for the first container based on a comparison of the derived location of the first container and the GPS determined location of the first container; and
    transmitting the adjusted location data to the first container.

2. The method of claim 1, wherein the method further comprises determining the relative distance between the first and second containers.

3. The method of claim 2, wherein the step of creating adjusted location data for the first container is based on a comparison of: the derived location of the first container, the GPS determined location of the first container, and the relative distance between the first and second containers.

4. An apparatus for determining the location of a shipping container, the apparatus comprising:
    a first GPS transponder for determining the location of a first container;
    a second GPS transponder for determining the location of a second container;
    a first processing unit configured to initiate a request for location and identifying data from the second container;
    a transmitting element for reporting the location and identifying data from the first and second containers to a remote monitoring station;
    a second processing unit configured to initiate a request by the second monitoring unit for location and identifying data from at least a third container;
    a third processing unit configured to determine a derived location of the first and second containers based on the time and direction of the signals received from the first and second container monitoring units at the remote monitoring station; wherein the third processing unit is further configured to compare the derived location of the first and second containers to the GPS determined locations of the first and second containers; and further wherein the third processing unit is further configured to create adjusted location data for the first container based on a comparison of the derived location of the first container and the GPS determined location of the first container; and
    a transmitting element for transmitting the adjusted location data to the first container.

5. The apparatus of claim 4, wherein the apparatus further comprises a distance measuring element to determining the relative distance between the first and second containers.

6. The apparatus of claim 5, wherein the third processing unit is further configured to create adjusted location data for the first container based on a comparison of: the derived location of the first container, the GPS determined location of the first container, and the relative distance between the first and second containers.

7. The apparatus of claim 6, wherein the distance measuring element comprises a laser range finder.

8. In a transportation system including at least a first container monitored by a first monitoring unit and having a first GPS transponder, and a second container monitored by a second monitoring unit and having a second GPS transponder, a method for determining the location of at least one container, the method comprising:
    determining the location for the first container from the first GPS transponder;
    determining the location of the second container from the second GPS transponder;
    initiating a request by the first monitoring unit for location and identifying data from the second container;
    reporting the location and identifying data from the first and second containers to a remote monitoring station;
    determining a derived location for the first and second containers based on the time and direction of the signals measured between the first and second container monitoring units and an RF transceiver at known point;
    comparing the derived location of the first and second containers to the GPS determined locations of the first and second containers;
    creating adjusted location data for the first container based on a comparison of the derived location of the first container and the GPS determined location of the first container; and
    transmitting the adjusted location data to the first container.

9. The method of claim 8, wherein the method further comprises determining the relative distance between the first and second containers.

10. The method of claim 9, wherein the step of creating adjusted location data for the first container is based on a comparison of the derived location of the first container, the GPS determined location of the first container, and the relative distance between the first and second containers.

* * * * *